April 29, 1969     C. G. DYE     3,441,387

DEAERATION AND COMPACTION OF SILICEOUS PIGMENT

Filed Aug. 12, 1965

INVENTOR

CLOYDE G. DYE

BY

Chisholm & Spencer

ATTORNEYS

United States Patent Office 3,441,387
Patented Apr. 29, 1969

3,441,387
DEAERATION AND COMPACTION OF
SILICEOUS PIGMENT
Cloyde G. Dye, Barberton, Ohio, assignor to PPG Industries Inc., Pittsburgh, Pa., a corporation of Pennsylvania
Filed Aug. 12, 1965, Ser. No. 479,129
Int. Cl. B01j 9/00
U.S. Cl. 23—313                     11 Claims

ABSTRACT OF THE DISCLOSURE

Powdery siliceous pigments are provided in a compacted form suitable for bulk handling. This is accomplished by deaerating powdery siliceous pigment while increasing its bulk density to between about 12 and about 15 pounds per cubic foot. This deaerated pigment is subsequently compacted to produce a product of low friability and acceptable dispersibility.

---

Figure 1:
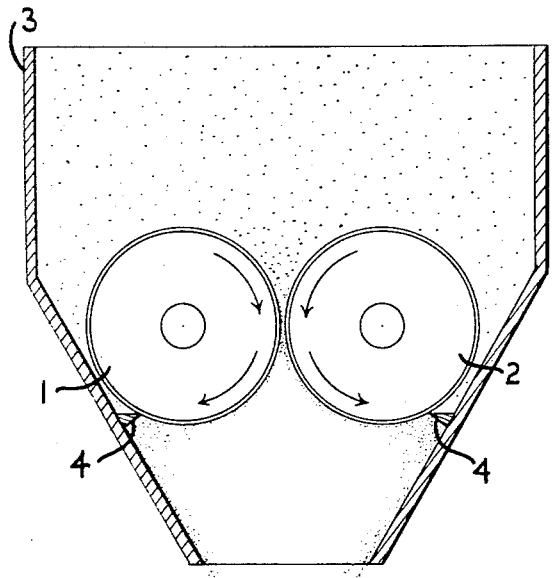

This invention relates to densifying finely-divided siliceous pigments. It more particularly relates to providing these pigments in a compacted form suitable for bulk handling.

Finely-divided siliceous pigments are commonly employed as raw materials in various chemical industries. They have particular application in the rubber, paper and plastics industries. The quantity of these pigments consumed annually warrants handling them in bulk. Unfortunately, the powdery nature of these materials makes such handling techniques difficult and uneconomical. In most applications which consume substantial quantities of siliceous pigment, the pigments must be highly dispersible, i.e., the pigment must incorporate in the process in finely-divided form. Previous attempts to produce an acceptable form of pigment suitable for bulk handling have been unsuccessful. Generally, when these materials have been compacted, the resulting pellets have been unacceptably friable. That is, upon extended handling or shipping, they have been susceptible to an unacceptable degree of degradation to smaller particle size. When pellets of low friability have been produced, they have had unacceptable dispersibility. For example, such material mixed into a rubber compound fails to break down into individual particles or acceptably small aggregates or agglomerates thereof.

The instant invention provides a method whereby finely-divided siliceous pigments are densified to form pellets, cakes, or blocks which may be handled in bulk without undue degradation. Although the friability of the compacted material produced in accordance with this invention is much reduced, the pigments retain suitable dispersion properties. Thus, the compacted material is readily reduced to powder by mechanical action somewhat greater than is encountered in bulk handling, e.g., by squeezing between the fingers.

According to the instant invention, a form of siliceous pigment suitable for bulk handling is produced by conditioning the pigment prior to its compaction. In densifying pigment in accordance with this invention, a mass of pigment is first deaerated. The deaerated pigment is then subjected to compressive action. In this fashion, a compacted form of pigment is produced which has relatively low friability and high dispersibility. The compacted material may be produced in a variety of shapes and sizes. It is conveniently produced in the form of pellets or blocks of uniform size.

Typical of the pigments which may be pelletized or compacted in accordance with this invention are those prepared in accordance with the teachings of U.S. Patent 2,940,830, the disclosure of which is hereby incorporated by reference. These pigments are preparing by reacting alkali metal silicates with acids. The BET surface areas of these products typically range from 75 to 200 square meters per gram. By "BET surface area" is meant the area measured by the recognized Brunauer-Emmett-Teller method, a description of which may be found in "The Journal of the American Chemical Society," vol. 60, page 309 (1938). These pigments are very finely-divided and have an average ultimate particle size of below about 0.1 micron usually about 0.03 micron as measured by the electron microscope. Pigments of lower surface area have a particle size in the range of 0.05 to 0.4 micron. These products usually contain in excess of 85 percent silica by weight on an anhydrous basis (free of both bound and free water). Metals may be introduced by contacting the silica with an aqueous solution of a salt containing the metal. In that event, the silica concentration may conform to that of a metallic silicate.

A typical analysis of a commercial siliceous pigment of this type is:

|  | Weight percent |
|---|---|
| $SiO_2$ | 87.5 |
| CaO | 0.75 |
| $R_2O_3$ ($Al_2O_3$ and $Fe_2O_3$) | 0.95 |
| NaCl | 1.6 |
| Weight loss at 105° C. (free water determination) | 6.3 |
| Weight loss at ignition less weight loss at 105° C. (bound water determination) | 2.0 |
| pH of 5% $H_2O$ suspension | 6.5 to 7.3 |
| Mean average particle size (as measured by the electron microscope) micron | 0.22 |
| BET surface area sq. m./g. | 140–160 |

Other siliceous pigments to which this invention is applicable include those prepared in accordance with the teachings of U.S. Patent 3,034,914, the disclosure of which is hereby incorporated by reference. These pigments are prepared by precipitating silica from an aqueous medium having a composition corresponding to that provided by mixing an acid such as hydrochloric acid with sodium silicate or like alkali metal silicate. Chemically they are comprised primarily of $SiO_2$ and usually one or more metal oxides, notably, alkali earth metal oxide, e.g., calcium oxide. As an example, the calcium oxide-silicon dioxide products can be represented on an anhydrous basis by the formula CaO $(SiO_2)_x$ where $x$ preferably ranges from 5 to 11 including fractional values. The average ultimate particle size of these products is typically less than 1.0 micron normally from about 0.005 to about 0.5 micron. The $SiO_2$ content on an anhydrous basis is at least 50 typically more than about 75 percent by weight. BET surface areas of these pigments typically range from about 30 to about 100 square meters per gram.

The invention is also applicable to pigments prepared by reacting solutions of aluminium sulfate and sodium silicate in accordance with U.S. Patents 2,739,073 and 2,848,346, the disclosures of which are hereby incorporated by reference. A typical analysis of this type of pigment is:

| | | |
|---|---|---|
| $SiO_2$ | weight percent | 64.6 |
| Total Na (reported as $Na_2O$) | do | 7.9 |
| CaO | do | 0.1 |
| $Al_2O_3$ | do | 12.1 |
| $Fe_2O_3$ | do | 0.2 |
| $Na_2SO_4$ | do | 5.5 |
| Free water | do | 6.0 |
| Bound water | do | 7.6 |
| BET surface area | sq. m./g. | 90 |
| Average ultimate particle size | micron | 0.024 |

The aforedescribed pigments are typically ground or milled during their manufacture. Usually, this grinding or milling results in substantial quantities of air being entrapped in the product. This fluffy mass of finely-divided undensified pigment typically has a bulk density of between about 3 and about 10, rarely above about 12 pounds per cubic foot. Upon storage, the bulk density of the pigment mass often increases slightly due to natural settling. Some of the air associated with the pigment escapes as the volume of the mass decreases. Even so, undensified pigment is almost fluid in its appearance and behavior even after prolonged storage.

In the practice of this invention, the pigment is deaerated substantially prior to being compacted. One measure of the extent of deaeration of a pigment is its increase in bulk density. Thus, it has been found that the siliceous pigments of this invention, i.e., finely-divided siliceous pigments containing at least 50 percent $SiO_2$ by weight and with a mean average ultimate particle diameter of less than about 1 micron, may be satisfactorily compacted when they are first deaerated sufficiently to increase their bulk densities about 1 to about 10 or more pounds per cubic foot over their undensified bulk densities.

Figure 2:
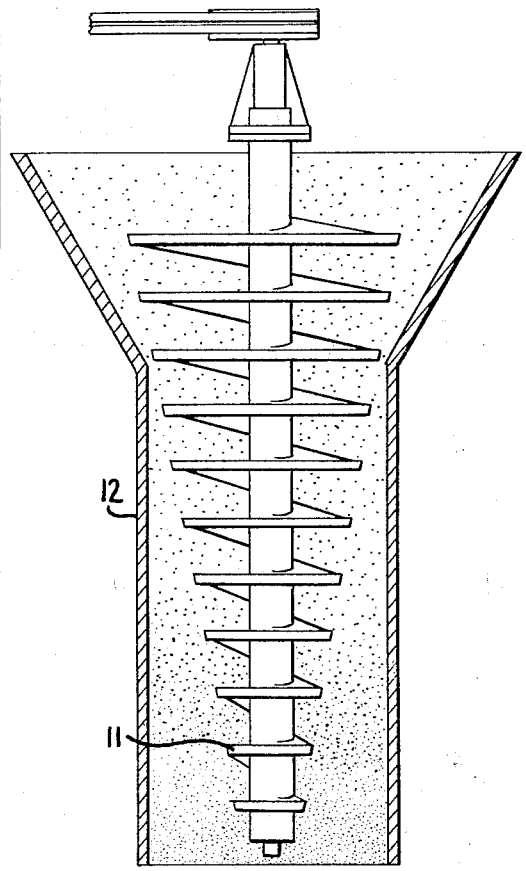
Figure 3:
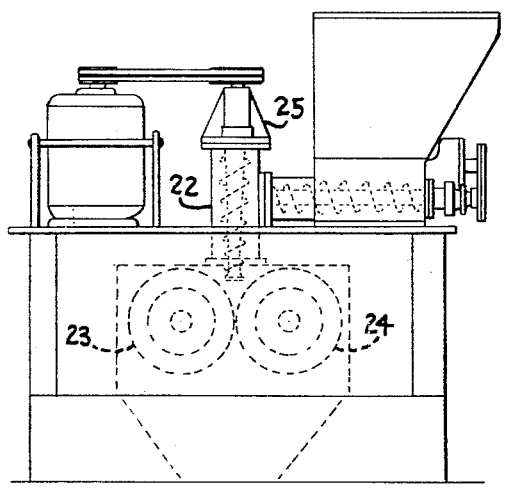
Figure 4:
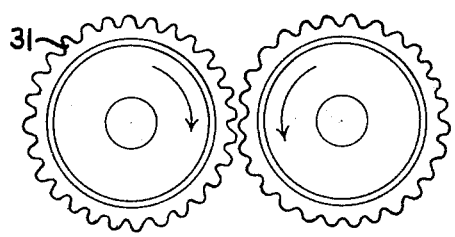

In the accompanying drawing, FIGURE 1 illustrates a deaerating means comprising a pair of rotating drums. FIGURE 2 illustrates a mechanical deaerating device comprising a screw of decreasing diameter. FIGURE 3 illustrates a preferred compacting device. FIGURE 4 shows a preferred surface configuration for compressing rollers.

Deaeration can be accomplished in any convenient manner. One convenient method is to pass the silica between countercurrently rotating drums 1 and 2 as illustrated in FIGURE 1. At least one of the drums pulls a vacuum thereby removing occluded air from the pigment. The drums are desirably housed in a sealed chamber 3 to isolate the vacuum system from the atmosphere. Deaeration is additionally facilitated by applying some mechanical pressure to the pigment as it passes between the drums. As the drums rotate, deaerated pigment is removed from the surfaces thereof by doctor blades 4.

Care must be taken not to over-compact the material during the deaeration step. Over-compactation results in entrapping occluded air in the densified pigment. The thus entrapped air tends to expand when the compacting pressure is released thereby significantly increasing the volume of the pigment mass. Additional air is thereby occluded in or entrapped by the pigment. The deaeration procedure is thus rendered less effective.

One particularly effective method of deaerating a mass of pigment is to move the mass through a confined volume by means of a tapering screw mechanism as illustrated in FIGURE 2. The screw mechanism 11 preferably tapers, i.e., reduces in diameter, in the direction of thrust of the pigment mass. Thus, the pigment mass is initially contacted by the widest portion of the screw. As the pigment is urged through the confined volume 12, the diameter of the screw decreases. It has been found that feeding pigment through such a device accomplishes a significant amount of deaeration.

The confined volume may be in the form of a hopper feed 22 to a mechanical compacting means as is shown in FIGURE 3. An acceptable product has been produced when the mass of pigment fed to the compacting means has been deaerated sufficiently to achieve a bulk density of at least 12 pounds per cubic foot, preferably about 15 or more pounds per cubic foot.

The mechanical compacting or pelletizing means may be of any desirable or convenient form. A particularly useful compacting device is the combination shown in FIGURE 3 of two concurrently rotating drums 23 and 24 operably associated with the deaerating means 25. The drums are adjustable to exert substantial pressure on material passing between them. It has been found particularly advantageous to corrugate the surface of the rollers such that they mesh together in gear fashion. FIGURE 4 illustrates a preferred set of rollers or drums with such a corrugated surface 31.

Although the pulverulent materials densified in accordance with this invention evidence low degradation upon normal handling, they are nevertheless readily reduced to powder with mild mechanical action. "Degradation," as used herein and in the claims, is determined by the following procedure:

A pneumatic conveying system of 3-inch pipe is charged with a classified cut of compacted material which passes through U.S.S. 8-mesh screen and is retained on U.S.S. 30-mesh screen. The pipe has a lift of 40 feet and a run of 6 feet and discharges into a 16-inch cyclone. The cyclone removes the solids from the air stream. The 8/30 material is forced through the piping at a rate of 8,000 pounds per hour by a blower set to develop 910 pounds of air per hour. Incorporated into the piping are two elbows, one adjacent the blower discharge and the other adjacent the cyclone feed. The conveyed material is collected from the cyclone and screened. A three-minute Rotap screen analysis is done on a 100–150 gram sample of the collected material. The weight percent of the material charged which passes 30-mesh screen after conveying is considered the percent degradation. If the percent degradation as a result of this test is 20 percent, the pigment is said to have a friability of 20 percent.

"Dispersion," as used herein and in the claims, refers to the degree of distribution of the pigment throughout the product in which it is incorporated, e.g., rubber or paper. This property is largely dependent on whether the pigment is distributed throughout the product in acceptably small aggregates of ultimate particles. Dispersion is determined by subjective visual inspection, often through a low power microscope, e.g., 10 power. Sometimes inspection is done through a more powerful, e.g., 100 power, lens. In usual practice, a sample of product containing the pigment being evaluated is visually compared with graded standards to classify the relative dispersion of the pigment. The effect of compaction on the dispersion properties of a pigment is conveniently determined by preparing a plurality of samples of product, e.g., rubber, from the same basic recipe. Normal uncompacted pigment is incorporated in one sample while compacted pigment is incorporated in a different sample. Visual comparison of the samples for gross imperfections will reveal whether or to what degree the dispersion properties of the pigment have been impaired by compaction.

In the practice of the instant invention, compacted pigments maintain acceptable dispersibility while achieving a degradation of less than about 25 percent. Often pigments can be sufficiently compacted to exhibit less than about 20 percent degradation and still have a dispersion comparable to the uncompacted pigment. Many pigments compacted to below about 10 to about 15 percent degradation maintain satisfactory dispersion properties.

Although the invention has been described with reference to particular specific details and certain preferred embodiments, it is not intended to thereby limit the scope of this invention except insofar as the details are recited in the appended claims.

I claim:
1. The method of compacting finely-divided powdery siliceous pigment with a mean average ultimate particle size of less than about 1 micron which comprises compressing said pigment to deaerate said pigment and to increase the bulk density of said pigment to between about 12 and about 15 pounds per cubic foot, removing the force of compression, feeding the deaerated pigment to mechanical compacting means and compacting said deaerated pigment by said mechanical compacting means to substantially further increase the bulk density of said deaerated pigment and to produce compacted pigment of low friability and acceptable dispersibility.

2. The method of claim 1 wherein the mean average ultimate particle size is about 0.005 to about 0.5 micron and wherein the friability of the compacted pigment is below about 25 percent.

3. The method of claim 2 wherein the friability of the compacted pigment is below about 20 percent.

4. The method of compacting finely-divided powdery siliceous pigment with a mean average ultimate particle size of less than about 1 micron which comprises compressing said pigment between two countercurrently rotating drums to deaerate said pigment and to increase the bulk density of said pigment to between about 12 and about 15 pounds per cubic foot, removing the deaerated pigment from between said drums, feeding said deaerated pigment to mechanical compacting means and compacting said deaerated pigment by said mechanical compacting means to substantially further increase the bulk density of said deaerated pigment and to produce compacted pigment of low friability and acceptable dispersibility.

5. The method of claim 4 wherein at least one of the drums pulls a vacuum thereby removing occluded air from said pigment.

6. The method of claim 4 wherein the mean average ultimate particle size of the pigment is about 0.005 to about 0.5 micron and wherein the friability of the compacted pigment is below about 25 percent.

7. The method of claim 6 wherein the friability of the compacted pigment is below about 20 percent.

8. The method of compacting finely-divided powdery siliceous pigment with a mean average ultimate particle size of less than about 1 micron which comprises feeding said pigment through a confined volume with a screw mechanism whose diameter decreases in the direction of thrust of the pigment to deaerate said pigment and to increase the bulk density of said pigment to between about 12 and about 15 pounds per cubic foot, removing the deaerated pigment from said confined volume, feeding said deaerated pigment to mechaniacl compacting means and compacting said deaerated pigment by said mechanical compacting means to substantially further increase the bulk density of said deaerated pigment and to produce compacted pigment of low friability and acceptable dispersibility.

9. The method of claim 8 wherein the mean average ultimate particle size of the pigment is about 0.005 to about 0.5 micron and wherein the friability of the compacted pigment is below about 25 percent.

10. The method of claim 9 wherein the friability of the compacted pigment is below about 20 percent.

11. The method of claim 10 wherein said pigment is compacted by passing said deaerated pigment between a pair of countercurrently rotating drums having corrugated surfaces which interlock in gear relationship with each other.

References Cited

UNITED STATES PATENTS

| | | | |
|---|---|---|---|
| 1,524,968 | 2/1925 | Ylouses. | |
| 1,567,408 | 12/1925 | Axelsen | 23—293 |
| 2,298,644 | 10/1942 | Hummel | 264—102 |
| 3,034,421 | 5/1962 | Pence | 23—313 |
| 3,144,413 | 8/1964 | Underwood | 23—313 |

OTHER REFERENCES

Ludwig: How and Why Solids Agglomerate, Chemical Engineering January 1954 pp. 156–160.

WILBUR L. BASCOMB, Jr., *Primary Examiner.*

U.S. Cl. X.R.

23—110, 293; 106—306; 264—102, 117